(12) United States Patent
Detofsky et al.

(10) Patent No.: US 10,295,406 B2
(45) Date of Patent: May 21, 2019

(54) INCREASED PROCESSING EFFICIENCY FOR OPTICAL SPECTRAL ANALYZERS

(71) Applicant: Intel Corporation, Santa Clara, CA (US)

(72) Inventors: Abram M Detofsky, Tigard, OR (US); Brett E Klehn, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/638,829

(22) Filed: Jun. 30, 2017

(65) Prior Publication Data

US 2019/0003888 A1   Jan. 3, 2019

(51) Int. Cl.
| | |
|---|---|
| *G01J 3/02* | (2006.01) |
| *G01J 3/04* | (2006.01) |
| *G01J 3/28* | (2006.01) |
| *G01J 3/12* | (2006.01) |

(52) U.S. Cl.
CPC .............. *G01J 3/04* (2013.01); *G01J 3/0213* (2013.01); *G01J 3/0218* (2013.01); *G01J 3/0227* (2013.01); *G01J 3/12* (2013.01); *G01J 3/28* (2013.01); *G01J 3/2803* (2013.01)

(58) Field of Classification Search
CPC ...... G01J 3/0218; G01J 3/2803; G01J 3/0213; G01J 3/28; G01J 3/12
See application file for complete search history.

(56) References Cited

U.S. PATENT DOCUMENTS 6,384,943 B2 * 5/2002 Ishikawa ............ G02B 6/29377
398/158

OTHER PUBLICATIONS

"8-Channel, Low Noise, Low Power, 24-Bit, Sigma-Delta ADC with PGA and Reference", Analog Devices AD7124-8 Data Sheet, (2016), 93 pgs.
"AD795 Low Power, Low Noise Precision FET Op Amp", (Feb. 23, 2017), 21 pgs.
"Bandwidth-Adjustable Tunable Filter", WL Photonics Inc., (Feb. 1, 2016), 6 pgs.
(Continued)

*Primary Examiner* — Hwa Andrew Lee
(74) *Attorney, Agent, or Firm* — Schwegman Lundberg & Woessner, P.A.

(57) ABSTRACT

An optical spectral analyzer for measuring an optical multi-channel signal by separating the multi-channel signal and measuring a plurality of single-channel signals simultaneously. The spectral analyzer can include a demultiplexer configured to receive the multi-channel signal. The multi-channel signal can be a multi-channel wavelength range. The demultiplexer can separate the multi-channel signal into the plurality of single-channel signals including a first single-channel signal and a second single-channel signal. The spectral analyzer can include a plurality of optical paths. The plurality of optical paths can include a plurality of respective detectors for measuring an optical power of the respective single-channel signals. The detectors can convert the optical power of the respective single-channel signals to corresponding electrical signals. In some examples, the spectral analyzer includes a controller configured to obtain the plurality of respective electrical signals simultaneously to correspondingly detect the optical power of the multi-channel signal across the multi-channel wavelength range.

8 Claims, 6 Drawing Sheets

(56) References Cited

OTHER PUBLICATIONS

"Couplers and Splitters", timbercon, (Oct. 2012), 1 pg.
"Keysight Technologies", 8163B Lightwave Multimeter 8164B Lightwave Measurement System 8166B Lightwave Multichannel System, (Jan. 15, 2016), 5 pgs.
"Product Guide 2017", Santec the Photonics Pioneer, (2017), 19 pgs.
"WLTF-NM Manual Narrow bandwidth Tunable Filter", WL Photonics Inc., (Feb. 1, 2015), 4 pgs.
"WLTF-WE Electrical Wide Bandwidth Tunable Filter", WL Photonics Inc., (Feb. 1, 2015), 3 pgs.
"4ch/8ch Mini Coarse Wavelength Division Multiplexer", AC Photonics, 2 pgs.
"MS9740A Optical Specrum Analyzer Operation Manual", 15th Edition Anritsu Corporation, (Jun. 23, 2014), 310 pgs, sent in 2 parts due to size.
"MS9740A Optical Spectrum Analyzer 600 nm to 1750 nm", Product Brochure Anritsu, (Feb. 19, 2014), 16 pgs.
"MS9740A Optical Spectrum Analyzer Product Introduction", Anritsu Corporation, (Feb. 2014), 26 pgs.

* cited by examiner

INCREASED PROCESSING EFFICIENCY FOR OPTICAL SPECTRAL ANALYZERS

TECHNICAL FIELD

This document pertains generally, but not by way of limitation, to spectrum analyzers.

BACKGROUND

Optical Spectrum Analyzers (OSAs) can be used to measure spectral output of an optical transmitter. In some examples, OSAs measure the magnitude and wavelength of a multi-channel signal across a full wavelength range of the OSA. Optical transmitters are sometimes evaluated to verify that the performance of the optical transmitter is within specification or design limits for a particular application or optical receiver. For instance, various parameters can be measured, such as the center wavelength emitted from the optical transmitter, the presence and amplitude of any side-mode effects (spurs), the amplitude of the emitted light, or other parameters. Many OSAs are standalone benchtop or rack mounted devices including optical detectors. Measurement of an optical sample can be performed in a manufacturing environment, at an optical transmitter supplier, or in the field, to name a few examples.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present application relates to devices and techniques for optical spectrum analyzer, such as a spectrum analyzer for measuring an optical multi-channel signal by separating the multi-channel signal and measuring a plurality of single-channel signals simultaneously. The following detailed description and examples are illustrative of the subject matter disclosed herein; however, the subject matter disclosed is not limited to the following description and examples provided. Portions and features of some embodiments may be included in, or substituted for, those of other embodiments. Embodiments set forth in the claims encompass all available equivalents of those claims.

The present inventors have recognized, among other technical challenges, one issue can include decreasing the time required to sample an optical signal, such as a multi-channel signal. For instance, the multi-channel signal can include a wavelength in the C-band, S-band, L-band, or X-band ranges. In some examples, the time to measure an optical sample can take 150 milliseconds or longer using a bench optical spectrum analyzer (OSA). For instance, the OSA can take 150 milliseconds to scan a desired multi-channel wavelength range of the optical sample. The present subject matter can provide a solution to this problem, such as by separating a multi-channel signal into a plurality of single-channel signals and measuring the plurality of single-channel signals simultaneously. As used herein, simultaneously refers to measuring at least a portion of one or more single-channel signals (e.g., a wavelength segment) concurrently. In other words, one or more single-channel signals can be measured in parallel. In one example, the spectral analyzer of the present disclosure can include a wavelength demultiplexer, at least two optical paths (e.g., a plurality of optical paths), and at least two detectors (e.g., a plurality of detectors). The demultiplexer can be configured to receive a multi-channel signal having a multi-channel wavelength range. The demultiplexer can separate the multi-channel signal into the plurality of single-channel signals. For instance, the plurality of single-channel signals can include different respective single-channel wavelength ranges of the multi-channel wavelength range. The plurality of optical paths can communicate the individual single-channel signals of the plurality of single-channel signals to respective detectors. In some examples, a plurality of tunable filters can be operatively coupled along the respective plurality of optical paths. The plurality of detectors can be communicatively coupled to respective optical paths and configured to measure an optical power of the respective single-channel signals. The detectors can convert the optical power of the respective single-channel signals into a plurality of corresponding electrical signals. In one or more examples, a controller can obtain the plurality of respective electrical signals simultaneously and correspondingly detect the optical power of the multi-channel signal across the multi-channel wavelength range. Because the plurality of detectors can receive the plurality of single-channel signals simultaneously, the time to measure the optical power of the multi-channel signal can be reduced by an order of magnitude corresponding to the number of single-channel signals. Accordingly, the spectral analyzer can measure the multi-channel signal across the multi-channel wavelength range in less than 120 milliseconds. In some examples, the spectral analyzer can complete a full scan of the multi-channel signal in 120 milliseconds, 5 milliseconds, or any value therebetween.

The present inventors have recognized, among other technical challenges, one issue can include providing increased resolution and reduced signal to noise ratio while decreasing the sample measurement time. Where the optical power of the single-channel signal exceeds a saturation level of one or more pixels of the respective detector, optical artifacts, such as blooming, can generate noise in the optical power measurements. The present subject matter can provide a solution to this problem, such as by providing a plurality of tunable filters along the respective optical paths. The tunable filters can be located between the demultiplexer and the first detector. The respective tunable filters can be configured to transmit a selected wavelength segment (e.g., one selected wavelength segment) of the plurality of wavelength segments. By transmitting the selected wavelength segment of the plurality of wavelength segments, the total optical power received at the detector can be reduced as well as the corresponding optical artifacts. In some examples, the selected wavelength segment is adjustable between a lower wavelength segment limit and an upper wavelength segment limit of the single-channel signal. The tunable filters can be adjustable to sweep the selected wavelength segment between the lower wavelength segment limit and the upper wavelength segment limit of the single-channel signal. The optical power of the individual wavelength segments can be measured and can accordingly increase the measurement resolution of the spectral analyzer for the plurality of single-channel signals. For instance, each of the wavelength segments from the respective detectors can be measured.

A further technical issue can include providing a spectral analyzer having a reduced size as compared to many bench optical spectrum analyzers (OSAs). For example, some bench OSAs consume about 27,000 cubic centimeters. Accordingly, the locations in which the bench OSAs can be stored can be limited. Often, the bench OSAs are bench or rack mounted. In some examples, the spectral analyzer of the present disclosure can provide a solution to this problem, such as by providing a smaller package for performing spectral analysis. For instance, the spectral analyzer can, in some instances, consume less than 1,000 cubic centimeters, or less than 750 cubic centimeters (e.g., $\frac{1}{35}^{th}$ of the bench OSA volume). Because the spectral analyzer has a reduced size, it can fit into smaller spaces than many bench OSAs. However, the spectral analyzer of the present disclosure is not limited to any particular size, for instance, it can be larger or smaller than the examples provided herein.

The subject matter of the present disclosure is not limited to manufacturing test and evaluation or validation of electronic light sources, such as laser light sources. For instance, in further examples, the present subject matter can be used for astrometric sensing or bio-chemical sensing, to name a few.

Figure 1:
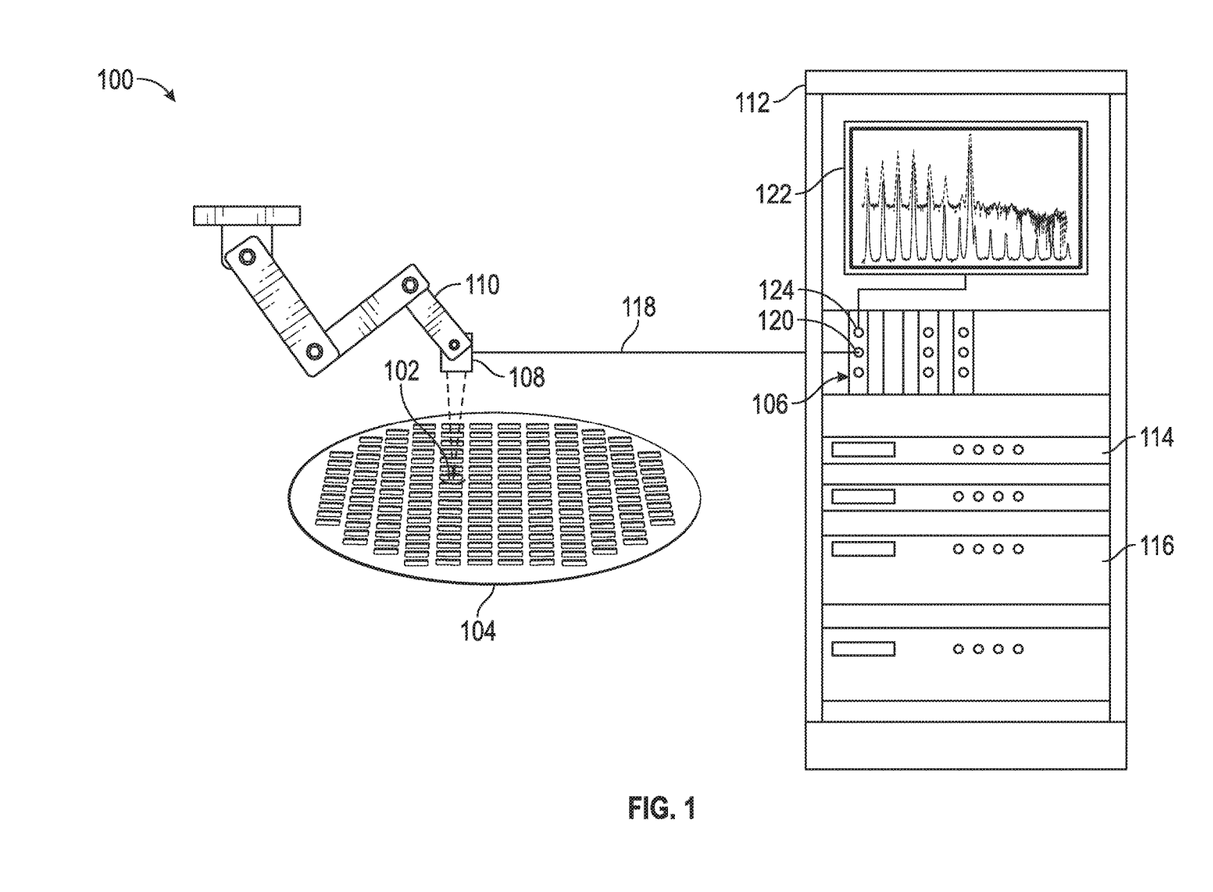
FIG. 1 illustrates an example of a system including an optical spectral analyzer, according to an embodiment.

FIG. 1 illustrates an example of a system 100 for measuring a multi-channel signal, according to an embodiment. The multi-channel signal can be emitted from a sample under test (referred to herein as an optical sample 102). For instance, the optical sample 102 can have a light source including, but not limited to, a light emitting diode (LED), PIN diode, laser (e.g., hybrid silicon laser, Ramen laser, silicon Ramen laser), or other type of light source. In the example of FIG. 1, a silicon wafer 104 can include a plurality of optical samples 102. For example, the optical sample 102 can be a semiconductor chip. In an example, the optical sample 102 can include silicon photonics for emitting the multi-channel signal. In some instances, the system 100 can be used to validate the optical performance of the optical sample 102 under test. For instance, the optical system 100 can measure the optical power of the multi-channel signal across a multi-channel wavelength range.

The system 100 can include an optical spectral analyzer 106 communicatively coupled to an optical collector 108. For instance, the spectral analyzer can include in input port 120. The optical collector 108 can be communicatively coupled to the input port 120 of the spectral analyzer 106, for instance, with an optical fiber 118. The optical collector 108 can be positioned to receive an optical signal, such as the multi-channel signal from the optical sample 102. As shown in the example of FIG. 1, the optical collector 108 can be positioned to receive the multi-channel signal emitted from the optical sample 102 under test. For instance, the optical collector 108 can be coupled to a holder 110. The holder 110 can be positioned to align the optical collector 108 to receive the multi-channel signal emitted from the optical sample 102.

In the example of FIG. 1, the holder 110 can be a robotic arm. As such, the holder 110 can be positionable to align the optical collector 108 to receive a multi-channel signal from a plurality of optical samples 102, such as a plurality of semiconductor chips on the wafer 104. In some examples, the holder 110 can be operated by a controller (e.g., computer) of the system 100 to position the optical collector 108 over each of a plurality of optical samples 102 individually, such as the plurality of semiconductor chips of the wafer 104.

As shown in the example of FIG. 1, the spectral analyzer 106 can be mounted in a rack 112, such as a standard server rack. The size of the spectral analyzer 106 can be smaller than a 1U, 2U, or 4U component (e.g., a 1U component 114 or a 4U component 116 as shown in FIG. 1). For instance, the spectral analyzer 106, in an example, can be 176×210× 14 mm as compared to a bench OSA, which, in some examples can be about 426×177×350 mm. Several illustrative examples are provided herein, however, the present inventors recognize that the subject matter of the present disclosure can be implemented in other package sizes. In a further example, the spectral analyzer 106 can be a stand-alone component or can be mounted in a personal computer chassis. In some examples, the system 100 can include a display 122. The display 122 can be communicatively coupled to an output port 124 of the spectral analyzer 106. Accordingly, the measurements of the spectral analyzer 106 can be represented on the display 122.

Figure 2:
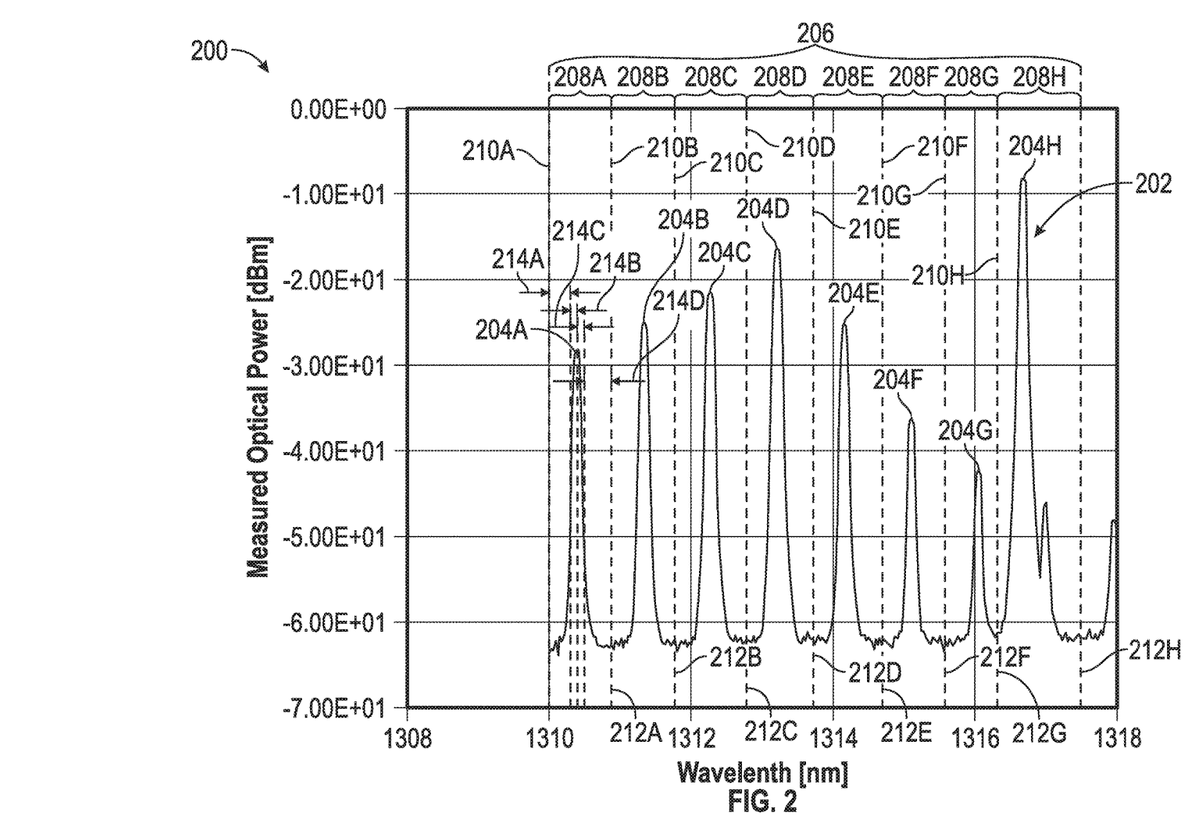
FIG. 2 is an example of a chart depicting a multi-channel signal, according to an embodiment.

FIG. 2 is an example of a chart 200 depicting a multi-channel signal 202, according to an embodiment. The x-axis of the chart 200 represents the wavelength of the multi-channel signal 202. The y-axis of the chart 200 represents the measured optical power of the multi-channel signal 202. The multi-channel signal 202 has a multi-channel wavelength range 206, for instance, 1310 to 1318 nanometers in the example of FIG. 2. The multi-channel signal 202 includes a plurality of single-channels signals 204A-H. In an example, the respective single-channel signals 204A-H have respective single-channel wavelength ranges 208A-H.

In various examples, the single-channel wavelength ranges, such as wavelength ranges 208A-H, can be less than the multi-channel wavelength range 206. For instance, the single-channel wavelength range can be less than two nanometers. The respective single-channel signals include a lower wavelength segment limit 210A-H and an upper wavelength segment limit 212A-H. In various examples, the plurality of respective single-channel wavelength ranges include different wavelength ranges, can overlap, or can be sequential. For instance, in the example of FIG. 2, a first single-channel signal 204A can be a portion of the multi-channel signal 202 spanning from the first lower wavelength segment limit 210A to a first upper wavelength segment limit 212A, and so on for the other single-channel signals.

One or more of the respective single-channel ranges 208A-H can be further divided into wavelength segments, such as wavelength segments 214A-D of the first single-channel signal 204A, as shown in the example of FIG. 2. The number and wavelength range of wavelength segments can be dependent on the resolution of the detector or filter as discussed further herein. In an example, one wavelength segment can include a wavelength range of 1 nanometer, 0.1 nanometers, or any value therebetween.

Figure 3:
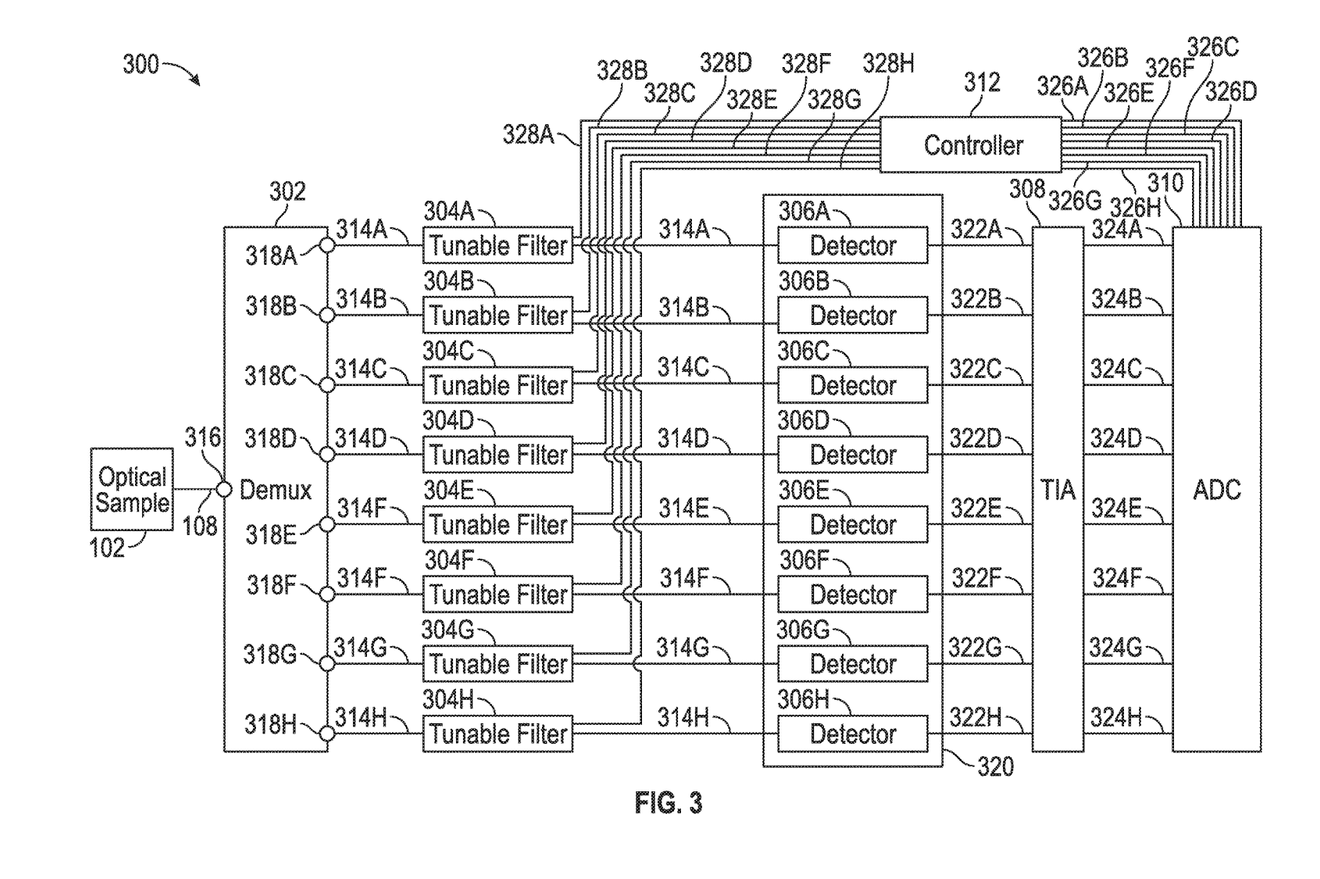
FIG. 3 illustrates an example of a spectral analyzer, according to an embodiment.

FIG. 3 is a schematic representation of an example of a spectral analyzer 300 (e.g., the spectral analyzer 106 as shown in FIG. 1 and described herein). The spectral analyzer 300 can include a demultiplexer 302, at least two optical paths (e.g., a plurality of optical paths 314A-H), and at least two corresponding detectors (e.g., a plurality of detectors 306A-H). The demultiplexer 302 can receive a multi-channel signal (e.g., the multi-channel signal 202 shown in FIG. 2. and described herein). For instance, the multi-channel signal can include a wavelength range in the C-band, S-band, L-band, or X-band ranges. A plurality of respective single-channel signals (e.g., single-channel signals 204A-H as shown in FIG. 2 and described herein) can be communicated to the respective detectors (e.g., detectors 306A-H) through the plurality of optical paths, such as optical paths 314A-H. Accordingly, the multi-channel wavelength range (e.g., multi-channel wavelength range 206) of the multi-channel signal 202 can be separated into the plurality of single-channel wavelength ranges (e.g., 208A-H) including the respective single-channel signals (e.g., 204A-H). Accordingly, the plurality of detectors 306A-H can sense the respective individual single-channel signals simultaneously. The plurality of detectors 306A-H can be electrically coupled to one or more trans-impedance amplifiers 308 (TIAs) for amplifying at least one electrical signal output by one or more of the detectors 306A-H. For instance, the one or more TIAs 308 can be electrically coupled to the respective detectors 306A-H with one or more electrical connections 322 A-H. One or more analog to digital converters 310 (ADC) can be electrically coupled to the one or more TIAs 308 with electrical connections 324A-H and can convert the plurality of amplified electrical signals from analog signals to digital signals. A controller 312 can receive the plurality of electrical signals from the ADC 310 (e.g., by electrical connections 326A-H) for measuring the plurality of single-channel signals of the multi-channel signal simultaneously.

As previously mentioned, the demultiplexer 302 can separate the multi-channel wavelength range of the multi-channel signal 202 into a plurality of different respective single-channel signals (e.g., single-channel signals 204A-H) having respective single-channel wavelength ranges. The demultiplexer 302 can include an input port 316 to receive the multi-channel signal from the light source (e.g., optical sample 102) through an optical fiber (e.g., optical collector 108). In an example, the demultiplexer 302 can be a coarse-width optical demultiplexer. For instance, the demultiplexer 302 can receive a multi-channel signal having a multi-channel wavelength range of 100 nanometers, twenty nanometers, ten nanometers, five nanometers, or any wavelength range therebetween. In an example, the multi-channel wavelength range is nine nanometers. In various examples, the wavelength range of the demultiplexer 302 can be configured for a wavelength range of the multi-channel optical signal (e.g., the optical sample under test). The demultiplexer 302 can include a plurality of output ports (e.g., output ports 318A-H). The output ports can communicate the plurality of single-channel signals through the various optical paths, such as optical paths 314A-H. In various examples, the number of output ports can include, but is not limited to, two, four, eight, twenty, one-hundred, or any number therebetween. In the example of FIG. 3, the demultiplexer 302 includes eight output ports 318A-H. In some examples, the demultiplexer 302 can separate the multi-channel signal into single-channel signals including different single-channel wavelength ranges. In other examples, the demultiplexer 302 can separate the multi-channel signal into single-channel signals including overlapping single-channel wavelength ranges or sequential single-channel wavelength ranges.

The plurality of optical paths 314A-H can communicate the respective plurality of single-channel signals (e.g., single-channel signals 204A-H) in the example, of FIG. 3, the optical paths 314A-H can include respective segments of optical fiber communicatively coupled between the demultiplexer 302 and the respective detectors, such as detectors 306A-H. In other examples, the optical path can include free-air transmission of the respective single-channel signals or a combination of free-air and optical fiber elements. In one example, the optical paths can be arranged in parallel and can include equal or similar lengths to reduce measurement deviations between the individual optical paths.

As previously described, the plurality of detectors, such as detectors 306A-H, can be communicatively coupled to the respective optical paths (e.g., optical paths 314A-H) to receive the plurality of single-channel signals. Stated another way, each individual detector can correspond to one of the respective single-channel signals communicated through the corresponding optical path. In an example, the plurality of detectors 306A-H can be included in a detector array 320. For instance, the detector array 320 can include a housing that supports the plurality of detectors 306A-H. The detectors, such as detectors 306A-H, can convert the optical power of the respective single-channel signals into a plurality of corresponding electrical signals. The optical power loss of the detector can be less than forty-five decibels, in some instances. In various examples, the detector can include, but is not limited to, a photodiode, charge-coupled device (CCD), active pixel sensor, gallium arsenide detector, silicon, or other photodetector. The plurality of detectors 306A-H can sense optical signals throughout the multi-channel wavelength range.

The spectral analyzer 300 can measure the plurality of single-channel signals simultaneously in order to measure the multi-channel signal across the multi-channel wavelength range. In other words, the spectral analyzer 300 can measure the respective single-channel signals (or at least a portion or a wavelength segment of the single-channel signals) in parallel. By separating the single-channel signals for simultaneous measurement, the spectral analyzer 300 can reduce the time to measure the multi-channel signal across the multi-channel wavelength range. For instance, the time to measure the multi-channel signal can be reduced in proportion to the number of single-channel signals separated from the multi-channel signal. Stated another way, the time to measure the multi-channel signal can be reduced in proportion to the number of optical paths. In various examples, the spectral analyzer 300 can measure the multi-channel signal in less than 120 milliseconds as compared to a bench OSA, which can in some examples, take longer than 150 milliseconds, five seconds, or more to measure the multi-channel signal.

In some examples, the spectral analyzer 300 can include a plurality of tunable filters, such as tunable filters 304A-H as show in FIG. 3. The plurality of tunable filters 304A-H can be located along the plurality of respective optical paths 314A-H between the demultiplexer 302 and the plurality of detectors (e.g., detectors 306 A-H). In one or more examples, the tunable filters 304A-H can be monochromators. For instance, the tunable filters can receive a single-channel signal including a plurality of individual wavelength segments from the demultiplexer 302, such as wavelength segments 214A-D shown in FIG. 2 and described herein. The tunable filters can be configured to transmit a selected wavelength segment of the plurality of wavelength segments. For instance, the tunable filter can transmit one selected wavelength segment of the plurality of wavelength segments.

In various examples, the tunable filters can be configured to adjust the respective selected wavelength segment of the single-channel signal between the lower wavelength segment limit and the upper wavelength segment limit. For instance, the tunable filter can include a diffraction grating, prism, or movable barrier that can be positionable to adjust the selected wavelength segment. Where the single-channel signal includes a single-channel range of two nanometers (e.g., from 1310-1312 nm), the plurality of wavelength segments can span from the lower wavelength segment limit (e.g., 210A-H) to the upper wavelength segment limit (e.g., 212A-H). In some examples, the wavelength segments can include a wavelength range of less than two nanometers, such as one nanometer, or 0.1 nanometers. In various examples, the wavelength ranges of the respective tunable filters are different, overlap, are sequential, or any combination thereof. In further examples, the wavelength ranges of the plurality of tunable filters are less than the multi-channel wavelength range of the multi-channel signal.

In some examples, tunable filters can be adjustable to sweep the selected wavelength segment between the lower wavelength segment limit and the upper wavelength segment limit. For instance, the tunable filter can sequentially change the selected wavelength segment between each of the wavelength segments from the lower wavelength segment limit to the upper wavelength segment limit or from the upper wavelength limit to the lower wavelength limit.

When the spectral analyzer 300 includes the tunable filters, the respective detectors can sense the respective single-channel signals with increased resolution and a reduced signal-to-noise ratio. For instance, the plurality of detectors can be photodiodes to sense optical power of one selected wavelength segment for each respective single-channel signal at a time. Blooming can occur when a pixel of the detector is over saturated with optical power and as a result excess power is transferred to surrounding pixels. Blooming can reduce the accuracy of the optical power measurement. In the example of FIG. 3, the detectors can mitigate blooming because the photodiodes are sensing the optical power of one respective wavelength segment at a time. Where the detector includes more than one pixel, all of the optical power received by the detector corresponds to the same wavelength segment, and thus blooming does not alter the measurement. Where the detector includes only a single pixel, there are no surrounding pixels for blooming to affect. Accordingly, the signal-to-noise ratio of the measured optical power of the multi-channel signal can be reduced.

In an example, the resolution of the measured optical power of the multi-channel signal can be based on the wavelength range of the individual wavelength segments. For instance, an increased number of wavelength segments can increase the resolution of the optical power measurement across the multi-channel wavelength range. In some examples, increasing the number of optical paths and corresponding tunable filters can decrease the time to measure the multi-channel signal over the multi-channel wavelength range. Measuring the multi-channel signal with a single detector can take a first period of time. The time to measure the multi-channel signal can be reduced to a second period of time by separating the multi-channel signal into the plurality of single-channel signals across the respective optical paths. The optical power of the respective single-channel signals can then be measured simultaneously with the plurality of respective detectors. The second amount of time can be proportionally shorter than the first amount of time based on the number of optical paths. In other words, the amount of time to measure the multi-channel signal can be divided by the number of single-channel signals that have been separated from the multi-channel signal.

In the example of FIG. 3, the spectral analyzer 300 includes the TIA 308. The TIA 308 can be electrically coupled to the plurality of detectors, such as detectors 306A-H, and accordingly the respective electrical signals produced by the detectors can be communicated to the TIA 308. The TIA 308 can amplify the corresponding electrical signals produced by the detectors, for instance, to a voltage, current, or power that is usable by the controller 312. As shown in the example of FIG. 3, the spectral analyzer 300 can include one TIA 308 to amplify the plurality of respective electrical signals from the detectors 306A-H. In further examples, the individual detectors, such as detectors 306A-H can be electrically coupled to individual TIAs. In various examples, the TIA can be an independent component or can be a circuit or sub-component of another device (e.g., a source measure unit or digital multi meter).

In some examples, the ADC 310 can be electrically coupled between the TIA 308 and the controller 312. Where the electrical signals from the detectors are analog signals, the ADC can convert the electrical signals to digital signals. The digital signals can be used by the controller 312 to measure the combined single-channel signals to determine the optical power of the multi-channel signal across the multi-channel wavelength range. In the example of FIG. 3, the spectral analyzer 300 includes one ADC 310. In other examples, the spectral analyzer can include a plurality of individual ADCs communicatively coupled to respective TIAs or detectors. In some examples, the ADC can be an independent component or can be a circuit or sub-component of another device (e.g., a source measure unit or digital multi meter). In a further example, the spectral analyzer, such as the spectral analyzer 300, can include an optical power meter including the detector (e.g., 306A-H), TIA (e.g., TIA 308), and ADC (e.g., ADC 310).

The controller 312 can include, but is not limited to, a computing system, such as a personal computer. In some examples, the controller 312 cart include, but is not limited to, one or more of a processor, memory, graphics processing unit (GPU), application specific integrated circuit (ASIC), field programmable array (FPGA), transceiver, power supply, various input and output connections, or any combination thereof. The controller can be communicatively coupled (e.g., wired or wirelessly) to at least one tunable filter, detector, TIA, ADC, or combinations thereof. In various examples, the controller 312 can receive the plurality of electrical signals from the ADC 310 or can receive a combined electrical signal (including the plurality of electrical signals from the respective detectors) from the ADC 310. In some examples, the TIA, ADC, or both can be integrated into the controller 312.

Where the spectral analyzer (e.g., spectral analyzer 300) includes the plurality of respective tunable filters (such as tunable filters 304A-H), the controller 312 can be communicatively coupled to the respective tunable filters. The controller 312 can be configured to adjust the respective tunable filters. For instance, the controller 312 can adjust the selected wavelength segment between the upper wavelength segment limit, the lower wavelength segment limit, or any wavelength segment therebetween. Accordingly, the controller 312 can be operable to adjust the respective tunable filters and to measure the plurality of electrical signals simultaneously to correspondingly detect the optical power of the multi-channel signal across the multi-channel wavelength range. The plurality of respective electrical signals can be combined by the controller 312 to correspondingly detect the optical power of the multi-channel signal across the multi-channel wavelength range. In a further example, the measured multi-channel signal can be stored in memory or presented on a display, such as the display 122.

Figure 4:
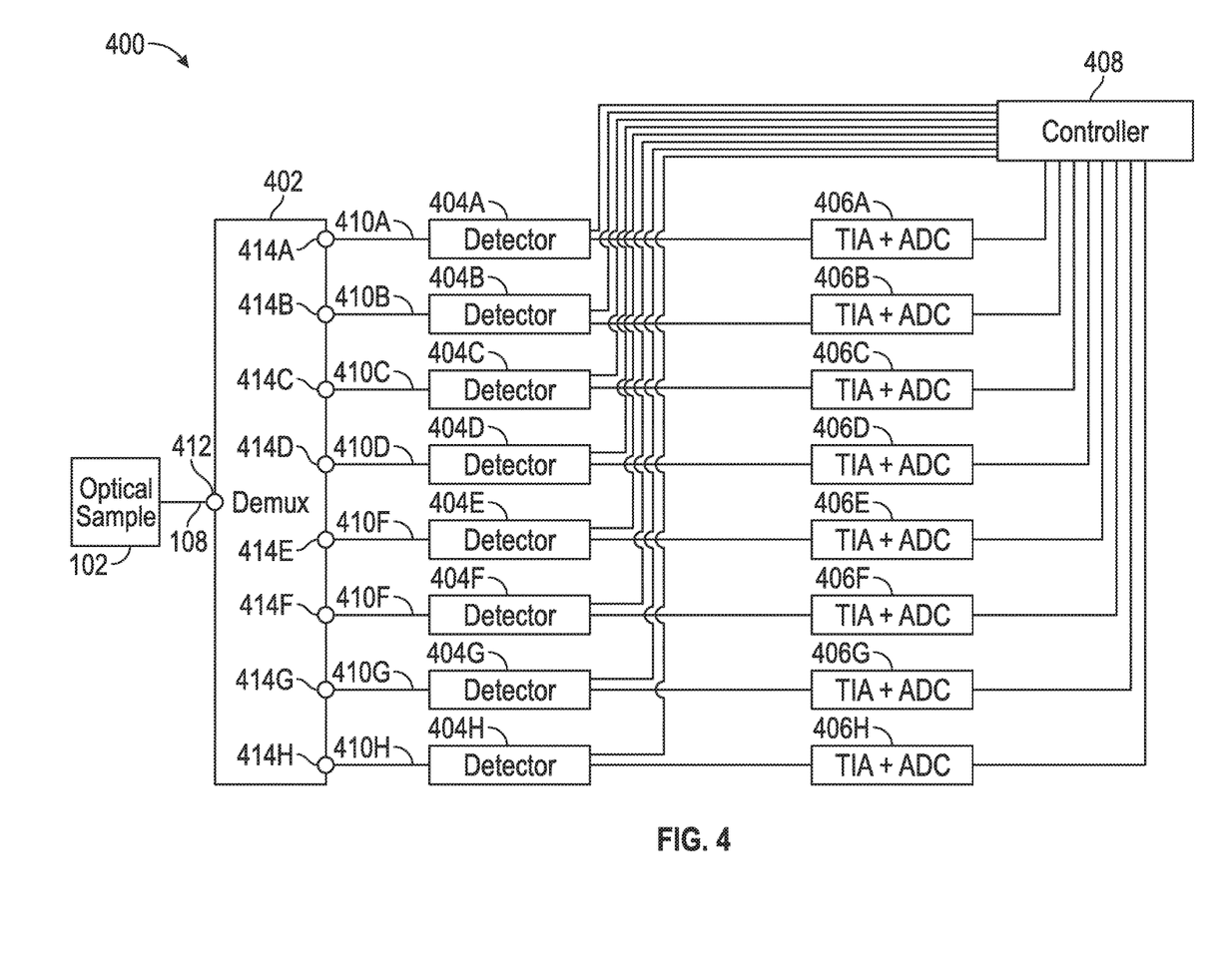
FIG. 4 illustrates a further example of a spectral analyzer, according to an embodiment.

FIG. 4 illustrates a further example of the spectral analyzer, such as a spectral analyzer 400. The Spectral analyzer 400 can include a demultiplexer 402 (e.g., similar to demultiplexer 302 as described herein), a plurality of detectors 404A-H, a plurality of combined TIAs and ADCs 406A-H (e.g., similar to the TIAs 308 and ADCs 310 as described herein), and a controller 408 (e.g., similar to controller 312 as described herein). The demultiplexer 402 can receive a light source from an optical sample, such as optical sample 102. For instance, an optical collector (e.g., the optical collector 108) can communicate the multi-channel signal to an input port 412 (e.g., similar to the input port 316) of the demultiplexer 402. As previously discussed, the demultiplexer 402 can separate the multi-channel signal, such as the multi-channel signal 202 (as shown in FIG. 2 and described herein) into a plurality of single-channel signals, such as single-channel signals 204A-H as shown in FIG. 2 and described herein. For instance, the plurality of single-channel signals can be transmitted from a plurality of output ports, such as output ports 414A-H, and communicated through a plurality of respective optical paths 410A-H to the respective detectors 404A-H.

In the example of FIG. 4, the detectors, such as detectors 404A-H, can be charge-coupled devices (CCDs). In an example, the detectors can be infrared CCDs. The plurality of detectors 404A-H and plurality of combined TIAs and ADCs 406A-H are shown as separate components in the example of FIG. 4, however, it is recognized that the plurality of detectors 404A-H and the plurality of combined TIAs and ADCs 406A-H can be integrated into a single component or CCD package. The detectors 404A-H can include a filter, grating (e.g., diffraction grating), or prism to separate the plurality of wavelength segments of the single-channel signal. The filter can be fixed into each of the detectors 404A-H. In various examples, the filter, grating, or prism can be integrated into one or more of the detectors or an independent component located along the respective optical paths 410A-H between the demultiplexer 402 and the plurality of respective detectors 404A-H. In the example shown in FIG. 4, the filter, grating, or prism is integrated into the respective detectors 404A-H.

One or more of the detectors 404A-H can include a plurality of pixels. The individual wavelength segments separated from the single-channel signal can be received by respective individual pixels of the detectors 404A-H. In other words, each wavelength segment of the plurality of wavelength segments can correspond to one or more individual pixels of each detector 404A-H. The detectors 404A-H can sense the plurality of wavelength segments of each single-channel signal simultaneously. Accordingly, the spectral analyzer 400 can measure the plurality of single-channel signals simultaneously. Thus, the amount of time required to measure the multi-channel signal can be reduced compared to the spectral analyzer 300 or compared to the bench OSA. For instance, in an example, the spectral analyzer 400 can measure the optical power of the multi-channel signal across the multi-channel wavelength range in less than 8 milliseconds.

Figure 5:
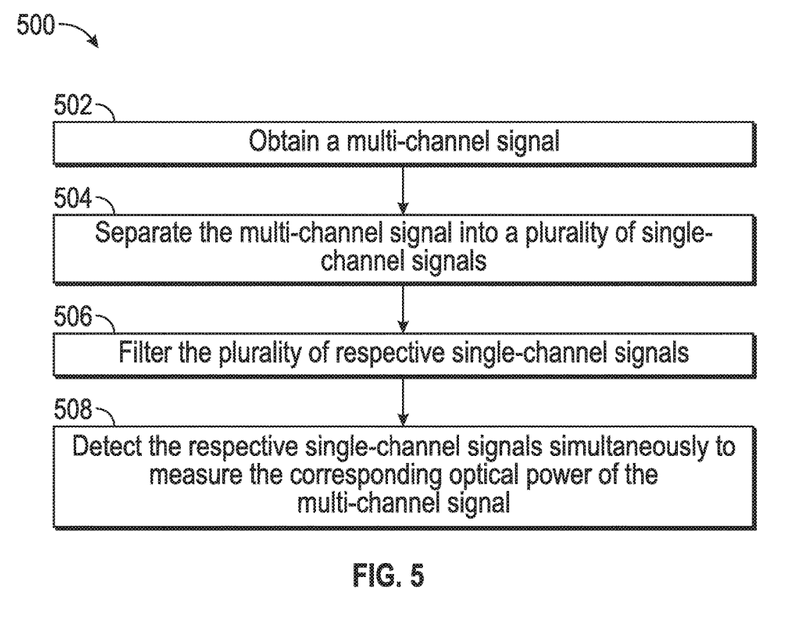
FIG. 5 is block diagram of an exemplary technique for measuring a multi-channel signal, according to an embodiment.

FIG. 5 is an example of a method 500 for measuring a multi-channel signal, such as a multi-channel signal across a multi-channel wavelength range as previously described in the examples herein and shown for instance in FIGS. 1-4. In describing the method 500, reference is made to one or more components, features, functions, and processes previously described herein. Where convenient, reference is made to the components, features, processes and the like with reference numerals. Reference numerals provided are exemplary and are nonexclusive. For instance, features, components, functions, processes, and the like described in the method 500 include, but are not limited to, the corresponding numbered elements provided herein. Other corresponding features described herein (both numbered and unnumbered) as well as their equivalents are also considered.

At 502, the multi-channel signal can be obtained. For instance, the multi-channel signal can be obtained from an optical sample under test, such as an LED, laser, or other light source. In a further example, the multi-channel signal can be obtained through an optical collector, such as an optical fiber as described herein. In some examples, the multi-channel signal can have a multi-channel wavelength range of 100 nanometers, twenty nanometers, five nanometers, or any wavelength range therebetween. In other examples, the multi-channel signal can include a wavelength in the C-band, S-band, L-band, or X-band ranges. For instance, the multi-channel wavelength range can include 1310 to 1318 nanometers as shown in the example of FIG. 2. The present inventors further recognize the subject matter of the present disclosure could apply to other wavelength ranges.

At 504, the multi-channel signal can be separated into a plurality of single-channel signals. For instance, the multi-channel signal can be separated into two or more single-channel signals. The single-channel signals can have a wavelength smaller than the multi-channel signal. In various examples, the single-channel signals can have different wavelength ranges (e.g., single-channel wavelength ranges), overlapping wavelength ranges, or sequential wavelength ranges. For instance, the plurality of single-channel wavelength ranges in combination can cover the multi-channel wavelength range.

At 506, the plurality of respective single-channel signals can be individually filtered to transmit a plurality of individual wavelength segments. For instance, one or more of the plurality of single-channel signals (in some examples, each single-channel signal) can be separated into the individual wavelength segments. In an example, each individual wavelength segment in combination can make up the single-channel wavelength segment.

In some examples, the respective single-channel signals can be individually filtered to transmit a selected wavelength segment of the plurality of wavelength segments. For instance, the selected wavelength segment of the plurality of wavelength segments can be adjusted between respective lower wavelength segment limits and upper wavelength segment limits of the respective single-channels. In a further example, adjusting the selected wavelength segment can include adjustably sweeping the respective selected wavelength segments of the plurality of wavelength segments between the lower wavelength segment limit and the upper wavelength segment limit of the single-channel signal. In some examples, the selected wavelength segment can be electronically adjusted using a controller, such as the controller 312 or controller 408 as shown in FIGS. 3 and 4 and previously described herein.

At 508, at least one wavelength segment of plurality of wavelength segments can be detected simultaneously from the respective single-channel signals to measure the corresponding optical power of the multi-channel signal across the multi-channel wavelength range. In an example, the plurality of selected wavelength segments of each respective single-channel signal can be detected sequentially. The plurality of single-channel signals can be filtered to adjust the selected wavelength segment until each of the plurality of wavelength segments is detected among each of the plurality of single-channel signals. Accordingly, each of the plurality of single-channel signals can be measured simultaneously, for instance, one wavelength segment at a time.

In a further example, the plurality of wavelength segments of each single-channel signal can be detected simultaneously. For instance, where the plurality of single-channel wavelength segments are filtered to transmit the plurality of wave length segments simultaneously, the plurality of the wavelength segments of the single-channel signals can be detected simultaneously.

In some examples, the respective single-channel signals can be converted into a plurality of respective electrical signals. For instance, the single-channel signals can be converted to corresponding electrical signals using a detector, such as a photodiode, CCD, or other semiconductor detector. The plurality of electrical signals can be amplified in voltage, current, or power for subsequent processing. In further examples, the plurality of electrical signals can be converted from analog signals to digital signals. The plurality of electrical signals can be obtained with a controller, such as the controller 312 or controller 408 as shown in FIGS. 3 and 4 and described herein. For instance, the plurality of electrical signals from the corresponding respective optical paths can be processed by the controller. In an example, the plurality of electrical signals can be combined to provide an overall electrical signal representing the measured multi-channel signal.

Figure 6:
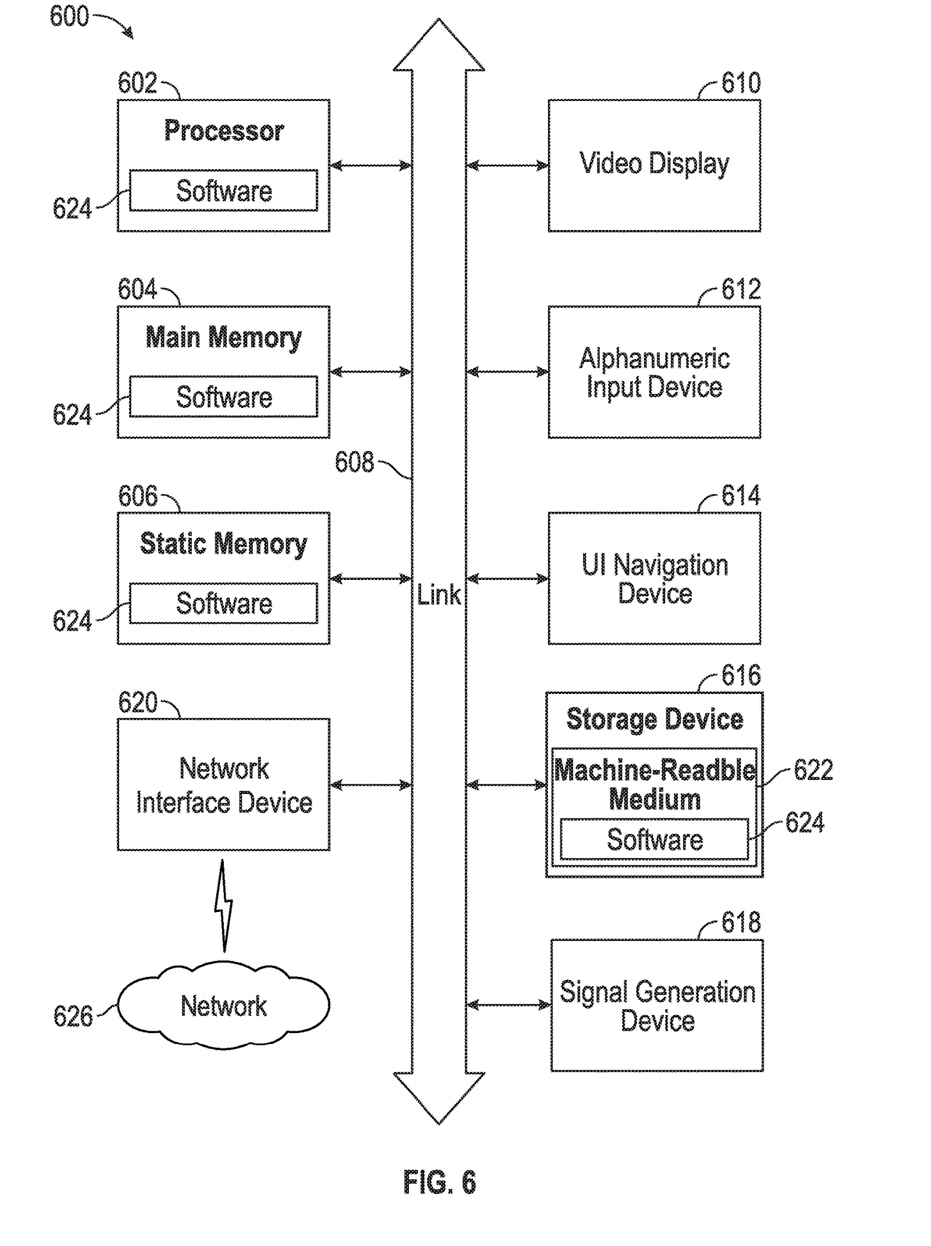
FIG. 6 illustrates a system level diagram in accordance with some embodiments of the invention.

FIG. 6 is a block diagram illustrating an example machine 600 upon which any one or more of the devices (e.g., spectral analyzers 300, 400 or controllers 312, 408) or techniques (e.g., methods, such as method 500) discussed herein may perform. In alternative embodiments, the machine 600 may operate as a standalone device or may be connected (e.g., networked) to other machines. The machine 600 may be a spectral analyzer (e.g., spectral analyzer 300, 400), personal computer (PC), a tablet PC, a set-top box (STB), a Personal Digital Assistant (PDA), a mobile telephone, a web appliance, a network router, switch or bridge, watch, smartwatch, smart home system, internet-of-things device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer, or computer system) 600 may include a hardware processor 602 (e.g., a CPU, GPU, a hardware processor core, or any combination thereof), a main memory 604, and a static memory 606, some or all of which may communicate with each other via an interlink (e.g., bus) 608. The machine 600 may further include a display device 610, an alphanumeric input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR)) connection to communicate or control one or more peripheral devices (e.g., a printer, card reader, etc.).

The mass storage device 626 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage device 616 may constitute machine readable media.

While the machine readable medium 622 is illustrated as a single medium, the term "machine readable medium" may include a single medium or multiple media (e.g., a centralized or distributed database, and/or associated caches and servers) that arranged to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received (e.g., transceived) over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 602.11 family of standards known as Wi-Fi®. IEEE 602.16 family of standards known as WiMAX®), peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples. To better illustrate the method and apparatuses disclosed herein, a non-limiting list of embodiments is provided here:

Example 1 is an optical spectral analyzer for measuring an optical multi-channel signal by separating the multi-channel signal and measuring a plurality of single-channel signals simultaneously, the spectral analyzer comprising: a demultiplexer configured to receive the multi-channel signal having a multi-channel wavelength range and to separate the multi-channel signal into the plurality of single-channel signals including a first single-channel signal and a second single-channel signal; a plurality of optical paths including: a first optical path including a first detector to measure an optical power of a plurality of individual wavelength segments of the first single-channel signal and convert the optical power of the first single-channel signal to a first electrical signal; and a second optical path including a second detector to measure an optical power of a plurality of individual wavelength segments of the second single-channel signal and convert the optical power of the second single-channel signal to a second electrical signal.

In Example 2, the subject matter of Example 1 optionally includes wherein the demultiplexer is a coarse width demultiplexer configured to separate the multi-channel signal into three or more single-channel signals, and the optical spectral analyzer includes three or more optical paths.

In Example 3, the subject matter of any one or more of Examples 1-2 optionally include wherein the first optical measurement path and the second optical measurement path include optical fiber communicatively coupling the demultiplexer and the respective first detector and second detector.

In Example 4, the subject matter of any one or more of Examples 1-3 optionally include a first tunable filter along the first optical path between the demultiplexer and the first detector and a second tunable filter located along the second optical path between the demultiplexer and the second detector.

In Example 5, the subject matter of Example 4 optionally includes wherein the respective first and second tunable filters are configured to transmit a selected wavelength segment of the plurality of wavelength segments, and wherein the selected wavelength segment is adjustable between a lower wavelength segment limit and an upper wavelength segment limit of the respective single-channel signal.

In Example 6, the subject matter of Example 5 optionally includes wherein the first and second tunable filters are adjustable to sweep the selected wavelength segment between the lower wavelength segment limit and the upper wavelength segment limit of the respective single-channel signal.

In Example 7, the subject matter of any one or more of Examples 4-6 optionally include wherein a wavelength range of the first single-channel signal is different than a wavelength range of the second single-channel signal.

In Example 8, the subject matter of any one or more of Examples 4-7 optionally include wherein the respective single-channel wavelength ranges of the first tunable filter and the second tunable filter are less than the multi-channel wavelength range of the multi-channel signal.

In Example 9, the subject matter of any one or more of Examples 4-8 optionally include wherein the first and the second tunable filters are electrically adjustable by a controller.

In Example 10, the subject matter of any one or more of Examples 4-9 optionally include a controller operable to adjust the respective tunable filters and to measure the first and second electrical signals simultaneously to correspondingly detect the optical power of the multi-channel signal across the multi-channel wavelength range.

In Example 11, the subject matter of any one or more of Examples 1-10 optionally include wherein the plurality of optical paths include respective optical gratings or prisms to divide the respective plurality of single-channel signals into a plurality of wavelength segments, and the plurality of detectors are charge-coupled devices to measure the optical power of the respective plurality of wavelength segments.

Example 12 is an optical spectral analyzer system comprising: a demultiplexer configured to receive a multi-channel signal having a multi-channel wavelength range and to separate the multi-channel signal into the plurality of single-channel signals including different respective single-channel wavelength ranges of the multi-channel wavelength range; a plurality of optical paths, wherein respective optical paths are configured to communicate individual single-channel signals of the plurality of single-channel signals; a plurality of tunable filters operatively coupled along the respective plurality of optical paths; a plurality of detectors communicatively coupled to respective optical paths and configured to measure an optical power of the respective single-channel signals and convert the optical power of the respective single-channel signals into a plurality of respective electrical signals; and a controller including a processor, the processor configured to obtain the plurality of respective electrical signals simultaneously to correspondingly detect the optical power of the multi-channel signal across the multi-channel wavelength range.

In Example 13, the subject matter of Example 12 optionally includes wherein the respective tunable filters are configured to transmit a respective selected wavelength segment of the plurality of wavelength segments, and wherein the respective tunable filters are adjustable to sweep the selected wavelength segment between a lower wavelength segment limit and an upper wavelength segment limit of the respective single-channel signal.

In Example 14, the subject matter of any one or more of Examples 12-13 optionally include wherein the plurality of tunable filters are electrically adjustable by a controller.

In Example 15, the subject matter of any one or more of Examples 12-14 optionally include a controller operable to adjust the respective tunable filters and to measure the respective electrical signals simultaneously to correspondingly detect the optical power of the multi-channel signal across the multi-channel wavelength range.

Example 16 is a method for measuring a multichannel signal, the method comprising: obtaining the multi-channel signal; separating the multi-channel signal into a plurality of single-channel signals; filtering the plurality of respective single-channel signals, individually, to transmit a plurality of individual wavelength segments detecting at least one wavelength segment of the plurality of wavelength segments simultaneously from the respective single-channel signals to measure the corresponding optical power of the multi-channel signal across the multi-channel wavelength range.

In Example 17, the subject matter of Example 16 optionally includes transmitting a selected wavelength segment of the plurality of wavelength segments for detection, and adjusting the selected wavelength segment of the plurality of wavelength segments between respective lower wavelength segment limits and upper wavelength segment limits of the respective single-channel signals.

In Example 18, the subject matter of Example 17 optionally includes wherein adjusting the selected wavelength segment includes adjustably sweeping the respective selected wavelength segments of the plurality of wavelength segments between the lower wavelength segment limit and the upper wavelength segment limit of the respective single-channel signal.

In Example 19, the subject matter of any one or more of Examples 17-18 optionally include wherein adjusting the selected wavelength segment includes electronically adjusting the respective selected wavelength segments with a controller.

In Example 20, the subject matter of Example 19 optionally includes converting the respective single-channel signals into a plurality of respective electrical signals and obtaining the plurality of electrical signals with the controller.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An optical spectral analyzer for measuring an optical multi-channel signal by separating the multi-channel signal and measuring a plurality of single-channel signals simultaneously, the spectral analyzer comprising:
- a demultiplexer configured to receive the multi-channel signal having a multi-channel wavelength range and to separate the multi-channel signal into the plurality of single-channel signals including a first single-channel signal and a second single-channel signal;
- a plurality of optical paths including:
- a first optical path including a first tunable filter to receive the first single-channel signal and generate first individual wavelength segments and a first detector to measure an optical power of the first individual wavelength segments and convert the optical power of the first single-channel signal to a first electrical signal;
- a second optical path including a second tunable filter to receive the second single-channel signal and generate second individual wavelength segments and a second detector to measure an optical power of the second individual wavelength segments and convert the optical power of the second single-channel signal to a second electrical signal; and
- a controller that sweeps the first tunable filter from a first lower wavelength limit to a first upper wavelength limit of the first individual wavelength segments and sweeps the second tunable filter from a second lower wavelength limit to a second upper wavelength limit of the second individual wavelength segments,
- wherein the first detector includes respective pixels to determine power of respective first individual wavelength segments and the second detector includes respective pixels to determine power of respective second individual wavelength segments, and
- wherein the controller is further operable to determine a power of the multi-channel signal based on the power of the respective first individual wavelength segments and the respective second individual wavelength segments.

2. The optical spectral analyzer of claim 1, wherein the demultiplexer is a coarse width demultiplexer configured to separate the multi-channel signal into three or more single-channel signals, and the optical spectral analyzer includes three or more optical paths.

3. The optical spectral analyzer of claim 1, wherein the first optical measurement path and the second optical measurement path include optical fiber communicatively coupling the demultiplexer and the respective first detector and second detector.

4. The optical spectral analyzer of claim 1, wherein a wavelength range of the first single-channel signal is different than a wavelength range of the second single-channel signal.

5. The optical spectral analyzer of claim 1, wherein the respective single-channel wavelength ranges of the first tunable filter and the second tunable filter are less than the multi-channel wavelength range of the multi-channel signal.

6. The optical spectral analyzer of claim 1, wherein the first and the second tunable filters are electrically adjustable by a controller.

7. A method for measuring a multichannel signal, the method comprising:
- obtaining the multi-channel signal;
- separating, by a demultiplexer, the multi-channel signal into a plurality of single-channel signals including a first single-channel signal and a second single-channel signal;
- filtering, by a first tunable filter and a second tunable filter, the plurality of respective first and second single-channel signals, individually, to transmit respective first individual wavelength segments and second individual wavelength segments;
- sweeping, by a controller, the first tunable filter between a first lower wavelength limit and a first upper wavelength limit of the first individual wavelength segments and sweeping the second tunable filter between a second lower wavelength limit and a second upper wavelength limit of the second individual wavelength segments,
- detecting, at a first detector including respective pixels to determine power of respective first individual wavelength segments and a second detector including respective pixels to determine power of respective second individual wavelength segments, at least one wavelength segment of the plurality of wavelength segments simultaneously from the respective first and second single-channel signals to measure the corresponding optical power of the multi-channel signal across the multi-channel wavelength range.

8. The method of claim 7, further comprising converting the respective single-channel signals into a plurality of respective electrical signals and obtaining the plurality of electrical signals with the controller.

* * * * *